Patented Sept. 1, 1925.

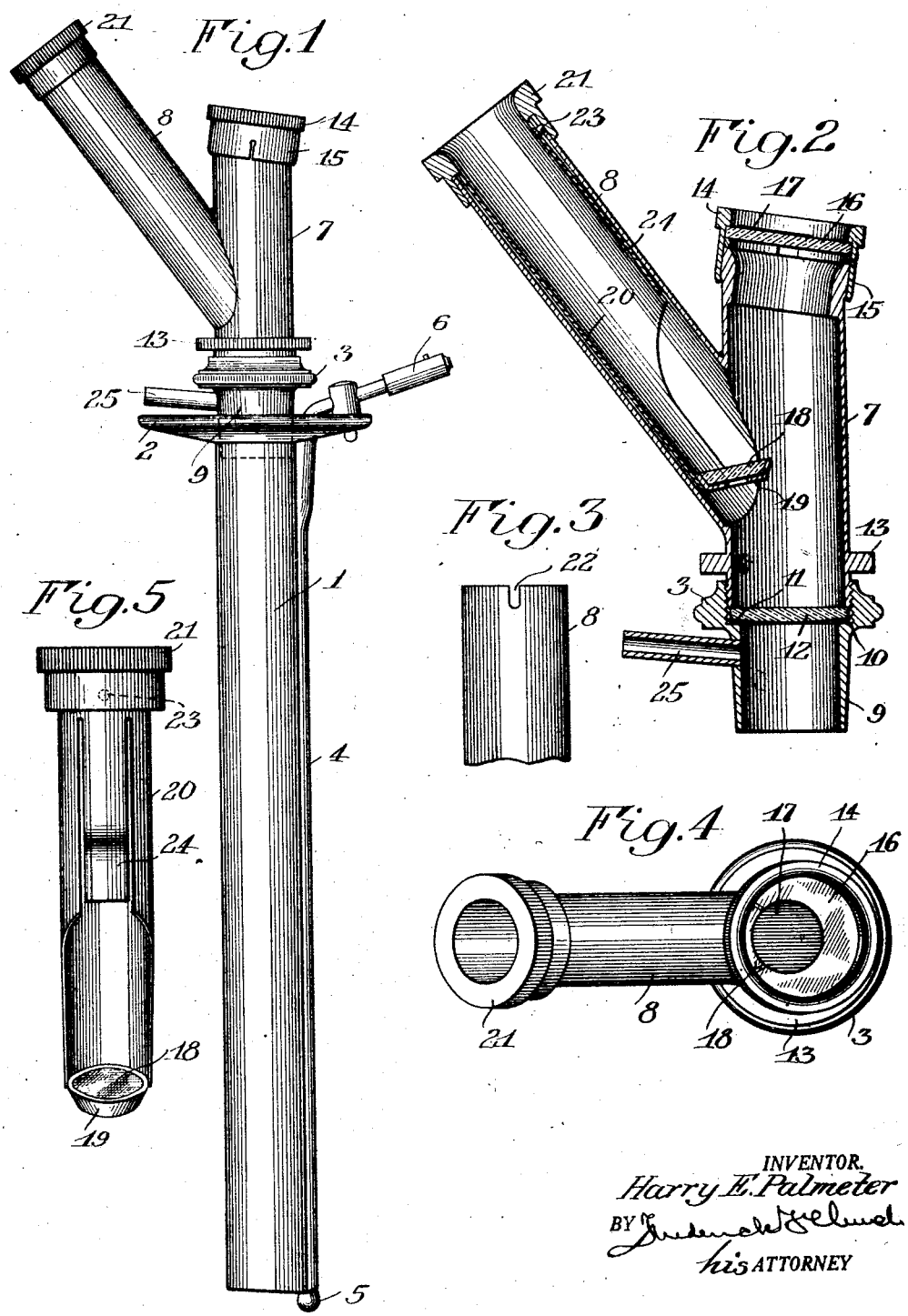

1,551,770

UNITED STATES PATENT OFFICE.

HARRY E. PALMETER, OF ROCHESTER, NEW YORK, ASSIGNOR TO ELECTRO SURGICAL INSTRUMENT COMPANY, OF ROCHESTER, NEW YORK, A CORPORATION OF NEW YORK.

SURGICAL INSTRUMENT.

Application filed March 16, 1923. Serial No. 625,508.

*To all whom it may concern:*

Be it known that I, HARRY E. PALMETER, a citizen of the United States, residing at Rochester, in the county of Monroe and State of New York, have invented certain new and useful Improvements in Surgical Instruments; and I do hereby declare the following to be a full, clear, and exact description of the same, reference being had to the accompanying drawings forming a part of this specification and to the reference numerals marked thereon.

My present invention relates to surgical instruments and more particularly to such instruments as specula, broncoscopes and sigmoidoscopes and it has for its object to provide an improved instrument of this character for viewing cavities of the body and which will be so constructed as to permit simultaneous observation by more than one person. To these and other ends the invention resides in certain improvements and combinations of parts all as will be hereinafter more fully described, the novel features being pointed out in the claims at the end of the specification.

In the drawings:

Figure 1 is a side view of a sigmoidoscope constructed in accordance with and illustrating one embodiment of my invention.

Figure 2 is an enlarged central sectional view of the observation mount thereof.

Figure 3 is a detail of the outer end of the secondary observation tube.

Figure 4 is an end view and

Figure 5 is a side view of the lens tube of the secondary observation tube.

Similar reference numerals throughout the several views indicate the same parts.

As previously stated I have illustrated my improvements in the present instance embodied in a sigmoidoscope as used for rectal and vaginal observation and referring more particularly to the drawing, 1 indicates the body or main tube provided with a suitable limiting flange 2 at its outer end in the region of which there is a slip joint connection with an observation mount 3. At the side of the body 1 is a tube 4 for the illuminating device which may be of the usual kind including a small electric bulb 5 at the end of the body and the cord connection 6 in the vicinity of the observation mount 3.

The observation mount embodies a main tube 7 and a secondary tube 8 projecting from the side thereof at an angle of approximately 45 degrees. The base of the main tube 7 is tapered at 9 to provide the slip joint previously referred to and just above this is an interior seat 11 for a collecting lens 12 on which the image of the object in focus at the illuminated end 5 of the tube is viewable. The main tube 7 is threaded as shown and screwed into the mount in such manner as to operate to hold the lens to its seat. For this purpose it is formed with a knurled flange 13.

At the upper end of the main tube 7 is the main eye piece consisting of a ring 14 having a spring flange 15 holding it thereto and confining a plain lens or glass 16 against the end of the tube. A limited area of this glass, preferably a circular portion 17 eccentrically arranged, is silvered to form a mirror or reflecting surface for a purpose which will hereinafter appear although said image is directly viewable through the glass 16 at one side of the silvered portion.

This main eye piece is tilted a little with respect to the longitudinal axis of the tube as shown for the purpose of reflecting the image along the axis of the secondary observation tube 8 as cast by the mirror 17.

The image so cast is caught by a second mirror 18 located at a proper angle at the base of the secondary observation tube 8 at the point of junction of the two tubes. The mirror 18 is carried in the present instance upon a bracket or a seat 19 attached to the inner end of a lens tube 20 received within the tube 8 and provided with an eye piece ring 21 at its outer end although no lens is necessary. The end of the tube 8 is slotted at 22 to receive a pin 23 on the eye piece ring that so centers the lens tube within the observation tube that the mirror 18 is maintained always at the proper angle and in the proper plane with reference to the mirror 17. The lens tube is frictionally held in place within the secondary observation tube 8 by means of a spring tongue 24 struck therefrom. These detachable arrangements are for the general purpose of rendering the instrument easily demountable for cleaning and sterilizing purposes.

It will be seen from the foregoing that two persons may make observation through the one instrument by means of the two eye pieces 14 and 21, the one through the direct eye piece 14 and the other through the secondary eye piece 21.

The nipple shown at 25 projecting laterally from the observation mount 3 is for connection with a compressed air supply tube provided for the purpose of admitting air to the body 1 to dilate the organ in which the observation is made. When this is brought into use the lens 12 acts as a seal for the body tube and prevents escape of the air in the region of either eye piece.

I claim as my invention:

1. In a speculum, the combination with a body tube, of a plurality of observation tubes leading into the same and provided with eye pieces through one of which an image at the end of the tube is directly viewable, of a mirror on the eye piece of said tube and a second mirror adapted to reflect an image therefrom to the eye piece of another tube.

2. In a speculum, the combination with a body tube and a collecting lens adapted to reflect an image located at one end of the tube, of a primary eye piece and a secondary eye piece, the former being provided with a mirror and a second mirror for reflecting an image from the first mirror to the secondary eye piece.

3. In a speculum, the combination with a body tube and a collecting lens adapted to reflect an image located at one end of the tube, of a primary eye piece and a secondary eye piece, the former being provided with a mirror, a detachable tube within the secondary tube and a mirror carried thereby for reflecting an image from the first mirror to the secondary eye piece.

4. In a speculum, the combination with a body tube and a collecting lens adapted to reflect an image located at one end of the tube, of a primary eye piece and a secondary eye piece, the former being provided with a mirror, a detachable tube within the secondary tube, a mirror carried thereby for reflecting an image from the first mirror to the secondary eye piece, and yielding frictional means for holding the detachable tube within the secondary tube.

5. In a speculum, the combination with a body tube, of an observation tube connected therewith, a collecting lens in one of said tubes, an eye piece at the outer end of the observation tube for viewing the object imaged by said lens, a second observation tube extended outwardly upon the first between the ends thereof, a mirror adjacent the base of the second observation tube and a second mirror carried by the first mentioned observation tube and adapted to reflect the image to the first mentioned mirror.

6. In a speculum, the combination with a body tube, of an observation tube detachably connected with the outer end thereof and having an eye piece thereon, a collecting lens in one of said tubes, a second observation tube projecting from the first at an obtuse angle to the body tube, a detachable holder within the second observation tube, a mirror carried thereby and a second mirror associated with the eye piece and adapted to reflect the image to the first mentioned mirror.

7. In a speculum, the combination with a body tube, of a pair of angularly disposed observation tubes forming a unitary structure detachably connected with said body tube, a collecting lens carried by one of said observation tubes, a holder detachably positioned within the other observation tube, a mirror carried by the holder adjacent the base of the last mentioned tube and an eye piece at the free end of the lens holding tube including a transparent element having a portion of its surface coated to form a mirror adapted to reflect the image to the first mentioned mirror.

HARRY E. PALMETER.